US010122832B2

(12) United States Patent
Borlick et al.

(10) Patent No.: US 10,122,832 B2
(45) Date of Patent: Nov. 6, 2018

(54) COMMUNICATIONS OF USERNAMES AND PASSWORDS TO A PLURALITY OF CLOUD STORAGES VIA A PLURALITY OF COMMUNICATIONS PROTOCOLS THAT CHANGE OVER TIME

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Roger G. Hathorn, Tucson, AZ (US); Karl A. Nielsen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/961,247

(22) Filed: Dec. 7, 2015

(65) Prior Publication Data
US 2017/0163772 A1    Jun. 8, 2017

(51) Int. Cl.
*G06F 15/16* (2006.01)
*H04L 29/06* (2006.01)
*H04L 29/08* (2006.01)

(52) U.S. Cl.
CPC .......... *H04L 69/08* (2013.01); *H04L 67/1097* (2013.01)

(58) Field of Classification Search
CPC ......... H04L 29/06047; H04L 29/06612; H04L 29/06163; H04L 29/06993; H04L 67/1097; H04L 69/08; H04L 69/18; H04L 69/28
See application file for complete search history.

(56) References Cited

U.S. PATENT DOCUMENTS 8,654,971 B2   2/2014  Orsini et al.
8,849,955 B2   9/2014  Prahlad et al.
(Continued)

OTHER PUBLICATIONS

Response dated Aug. 22, 2016, pp. 12, to Office Action dated May 20, 2016, pp. 20, for U.S. Appl. No. 14/961,208, filed Dec. 7, 2015.
(Continued)

*Primary Examiner* — Lance Leonard Barry
(74) *Attorney, Agent, or Firm* — Rabindranath Dutta; Konrad Raynes Davda & Victor LLP (57) ABSTRACT

A computational device has an interface to access a heterogeneous cloud storage comprised of a first cloud storage maintained by a first entity and a second cloud storage maintained by a second entity. The computational device transmits, via a first communications protocol over the interface, a first set of data comprising usernames to a first cloud storage maintained by a first entity. The computational device transmits, via a second communications protocol, a second set of data comprising passwords corresponding to the usernames to a second cloud storage maintained by a second entity. On elapse of a first predetermined amount of time or the first communications protocol being compromised, the first communications protocol is changed to a third communications protocol. On elapse of a second predetermined amount of time or the second communications protocol being compromised, the second communications protocol is changed to a fourth communications protocol.

11 Claims, 9 Drawing Sheets

(56) References Cited

U.S. PATENT DOCUMENTS

| | | | |
|---|---|---|---|
| 9,052,962 | B2 | 6/2015 | Lee et al. |
| 9,075,529 | B2 | 7/2015 | Karve et al. |
| 9,258,765 | B1* | 2/2016 | daCosta ............... H04W 40/02 |
| 2005/0078702 | A1* | 4/2005 | Heuer ................. G06K 7/10297 |
| | | | 370/466 |
| 2005/0157662 | A1 | 7/2005 | Bingham et al. |
| 2007/0153763 | A1 | 7/2007 | Rampolla et al. |
| 2007/0204089 | A1 | 8/2007 | Proctor |
| 2008/0148063 | A1* | 6/2008 | Hanko .................... G06F 21/10 |
| | | | 713/189 |
| 2009/0300707 | A1* | 12/2009 | Garimella ........... H04L 63/0823 |
| | | | 726/1 |
| 2010/0325199 | A1 | 12/2010 | Park et al. |
| 2012/0042162 | A1* | 2/2012 | Anglin .................... G06F 21/57 |
| | | | 713/165 |
| 2012/0116846 | A1* | 5/2012 | Levy ....................... G06Q 20/10 |
| | | | 705/7.32 |
| 2012/0303736 | A1 | 11/2012 | Novotny et al. |
| 2013/0086283 | A1* | 4/2013 | Miller ............ G01B 31/318533 |
| | | | 710/11 |
| 2013/0086415 | A1* | 4/2013 | Petersen ............. G06F 11/2076 |
| | | | 714/6.3 |
| 2013/0179985 | A1 | 7/2013 | Strassmann et al. |
| 2013/0204849 | A1* | 8/2013 | Chacko ................. G06F 3/0604 |
| | | | 707/692 |
| 2014/0181901 | A1 | 6/2014 | Markel et al. |
| 2014/0201541 | A1 | 7/2014 | Paul et al. |
| 2015/0052354 | A1 | 2/2015 | Purohit |
| 2015/0304343 | A1* | 10/2015 | Cabrera .................. H04L 63/14 |
| | | | 726/23 |
| 2015/0347489 | A1 | 12/2015 | Sherwin |
| 2015/0379292 | A1 | 12/2015 | Lewis |
| 2016/0004611 | A1 | 1/2016 | Lakshman et al. |
| 2016/0162693 | A1 | 6/2016 | Breuer et al. |

OTHER PUBLICATIONS

Office Action dated May 20, 2016, pp. 20, for U.S. Appl. No. 14/961,208, filed Dec. 7, 2015.

Response to Office Action for U.S. Appl. No. 14/961,166, dated Jun. 29, 2016, 11 pp.

Response dated Jan. 23, 2017, pp. 12, tFinal Office Action dated Oct. 21, 2016, pp. 25, for U.S. Appl. No. 14/961,166, filed Dec. 7, 2015.

Response dated Feb. 27, 2017, pp. 14, to Final Office Action dated Nov. 25, 2016, pp. 24, for U.S. Appl. No. 14/961,208, filed Dec. 7, 2015.

Office Action dated Apr. 20, 2017, pp. 22, for U.S. Appl. No. 14/961,208, filed Dec. 7, 2015.

Final Office Action dated Nov. 25, 2016, pp. 24, for U.S. Appl. No. 14/961,208, filed Dec. 7, 2015.

Final Office Action dated Oct. 21, 2016, pp. 25, for U.S. Appl. No. 14/961,166, filed Dec. 7, 2015.

Office Action dated Jun. 14, 2017, pp. 31, for U.S. Appl. No. 14/961,166, filed Dec. 7, 2015.

Response dated Aug. 22, 2017, pp. 12, to Office Action dated Apr. 20, 2017, pp. 22, for U.S. Appl. No. 14/961,208, filed Dec. 7, 2015.

I. Morozan, "Multi Clouds Database: A New Model to Provide Security in Cloud Computing", (online) https://www.researchgate.net/publication/273136522 (accessed on Apr. 1, 2015).

Response dated Sep. 14, 2017, pp. 13, to Office Action dated Jun. 14, 2017, pp. 31, for U.S. Appl. No. 14/961,166, filed Dec. 7, 2015.

List of IBM Patents or Patent Applications Treated as Related, dated Dec. 2015, pp. 2.

Singh, et al., "A Secured Cost-Effective Multi-Cloud Storage in Cloud Computing," IEEE INFOCOM 2011 Workshop on Cloud Computing, IEEE, pp. 625-630, 2011.

Alice, et al., "Enhancing Security of Multi-Cloud Architecture using Combination of Approaches," 2015 IJSRSET, v.1, i.2, pp. 250-253, Mar.-Apr. 2015.

U.S. Appl. No. 14/961,166, filed Dec. 7, 2015.

U.S. Appl. No. 14/961,208, filed Dec. 7, 2015.

Office Action dated Apr. 1, 2016, pp. 17, for U.S. Appl. No. 14/961,166, filed Dec. 7, 2015.

M. Schnjakin, et al., "Applying Erasure Codes for Fault Tolerance in Cloud-RAID", 2013 IEEE 16th International Conference on Computational Science and Engineering, pp. 10.

I. Arora, et al., "Cloud Databases: A Paradign Shift in Databases", International Jourance of Computer Science, Issues, vol. 9, Issue 4, No. 3, Jul. 2012, pp. 7.

M.Mowbray, et al., "Enhancing Privacy in Cloud Computing via Policy-Based Obfuscation", The Journal of Supercomputing, 2010, pp. 25.

M. Schnjakin, et al., "Evaluation of Cloud-RAID: A Secure and Reliable Storage Above the Clouds", 2013 22nd International Conference on Computer Communication and Networks, Nassau, 2013, pp. 9.

C. Curino, et al., "Relational Cloud: A Database-as-a-Service for the Cloud", 5th Biennial Conference on Innovative Data Systems Research, CIDR 2011, Jan. 9-12, 2011, pp. 7.

J. Wang, et al., "Reducing Storage Overhead with Small Write Bottleneck Avoiding in Cloud RAID System", IEEE Computer Society, 2012 ACM/IEEE 13th International Conference on Grid Computing, pp. 10.

W. Qiyue, "Research on Column-Store Databases Optimization Techniques", IEEE, 2015 International Conference on Logistics, Informatics and Service Sciences, Barcelona 2015, pp. 6.

Notice of Allowance dated Nov. 30, 2017, pp. 22, for U.S. Appl. No. 14/961,208, filed Dec. 7, 2015.

Notice of Allowance dated Dec. 18, 2017, pp. 25, for U.S. Appl. No. 14/961,166, filed Dec. 7, 2015.

Notice of Allowance dated Apr. 4, 2018, pp. 14, for U.S. Appl. No. 14/961,166, filed Dec. 7, 2015.

B.S. Rawal, et al., "Split-System: The New Frontier of Cloud Computing", 2015 IEEE 2nd International Conference on Cyber Security and Cloud Computing, New York, NY, 2015, pp. 374-381.

X. Zhang, et al., "Ensure Data Security in Cloud Storage", 2011 International Conference on Network Computing and Information Security, Cuililn, 2011, pp. 284-287.

B. Joan, "Difference Between MTP and MSC", [online][Apr. 16, 2017] http://www.differencebetween.net/technology/difference-between-mtp-and-msc, pp. 5.

Notice of Allowance dated Mar. 1, 2018, pp. 11, for U.S. Appl. No. 14/961,208, filed Dec. 7, 2015.

* cited by examiner

COMMUNICATIONS OF USERNAMES AND PASSWORDS TO A PLURALITY OF CLOUD STORAGES VIA A PLURALITY OF COMMUNICATIONS PROTOCOLS THAT CHANGE OVER TIME

BACKGROUND

1. Field

Embodiments relate to a method, system, and computer program product communications to a plurality of cloud storages via a plurality of communications protocols that change over time.

2. Background

Cloud storage is a model of data storage in which digital data is stored in logical pools, and the physical storage spans a plurality of servers. The physical storage environment may be owned and managed by a hosting company. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments a storage controller may comprise a plurality of storage servers that are coupled to each other, where one or more of the storage servers may comprise a plurality of processing nodes or servers. The storage controller allows host computing systems to perform input/output (I/O) operations with storage devices controlled by the storage controller.

Network security is a branch of computer security specifically related to networks, and may involve browser security, security of data in transmission, security of other applications in the networked environment, security of the operating systems of computers in the networked environment, etc. Computer communications represents an insecure channel for exchanging information leading to a high risk of intrusion or fraud, such as via the interception and decryption of communications. Different mechanisms have been used to protect the transfer of data via various communications protocols that may include encryption and/or other operations to securely establish connections and transfer data. For example a Secure Sockets Layer (SSL) protocol may be used for connections between two computational devices. A Virtual Private Network (VPN) protocol may be used to link two computational devices such that they appear to be in a local private network. A VPN tunnel may be used to securely communicate between the two computational devices. Internet Protocol Security (IPsec) is a set of protocols that run over the Internet Protocol (IP) layer. IPSec allows two or more computational devices to communicate in a secure manner by authenticating and encrypting each IP packet of a communication session. A VPN established over IPSec is referred to a IPSec VPN. OpenVPN is an open-source software application that provides virtual VPN techniques for creating secure point-to-point or site-to-site connections in routed or bridged configurations and remote access facilities. Internet direct connect is another mechanism for secure data communications. Various other communications protocols may be used for secure data communications.

SUMMARY OF THE PREFERRED EMBODIMENTS

Provided are a method, a system, and a computer program product in which a computational device transmits, via a first communications protocol, a first set of data to a first cloud storage maintained by a first entity. The computational device transmits, via a second communications protocol, a second set of data to a second cloud storage maintained by a second entity.

In additional embodiments, the first set of data and the second set of data are both parts of an entire dataset, wherein the entire dataset is stored in the first cloud storage and the second cloud storage by storing the first set of data in the first cloud storage and the second set of data in the second cloud storage.

In further embodiments, the computational device changes the first communications protocol to a different communications protocol after an elapse of a first predetermined amount of time, to transmit additional data from the computational device to the first cloud storage.

In yet further embodiments, the computational device changes the second communications protocol to another communications protocol after an elapse of a second predetermined amount of time, to transmit further data to the second cloud storage.

In additional embodiments, in response to a compromise of the first or the second communications protocol, the computational device changes the compromised communications protocol to another communications protocol that is not compromised.

In certain embodiments, the computational device is a storage controller coupled to a plurality of hosts, wherein the first cloud storage is separated at least by 10 kilometers from the second cloud storage, and wherein the first entity and the second entity are different vendors that provide cloud computing services to the storage controller for the plurality of hosts.

In additional embodiments, the first communications protocol comprises a Virtual Private Network (VPN) tunnel, and the second communications protocol comprises an Internet direct connect. The first communications protocol is changed from the VPN tunnel to a Secure Sockets Layer (SSL) protocol, subsequent to an expiry of a period of time.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Many security issues may be associated with cloud storage. For example, a communications protocol may be compromised via a security flaw leading to a loss of sensitive information during transmission of data. Additionally, if a cloud storage is compromised, then data stored in the cloud storage may be stolen. For example, if there is an exploitable security flaw in the SSL protocol, passwords may be stolen during transmission of the passwords over a communications link to the cloud storage. If a cloud device that stores both usernames and corresponding passwords is compromised, then the usernames and corresponding passwords may be stolen.

Certain embodiments ensure security by providing cloud storages from different vendors and communicating to the different cloud storages via different communications protocols. In certain embodiments, the different communications protocol may be changed over time. In certain other embodiments, if a communications protocol is compromised, then the compromised communications protocol may be changed to a different communications protocol.

Certain embodiments divide the data into multiple parts, and consistently store different parts of the data in different cloud storage devices maintained by different vendors via different protocols. For example, by storing the first half of a password in one cloud storage and by storing the other half of the password in another cloud storage greater security may be provided against theft and unauthorized use of the password. If one of the cloud storages is compromised then only a part of a password may be compromised.

Exemplary Embodiments

Figure 1:
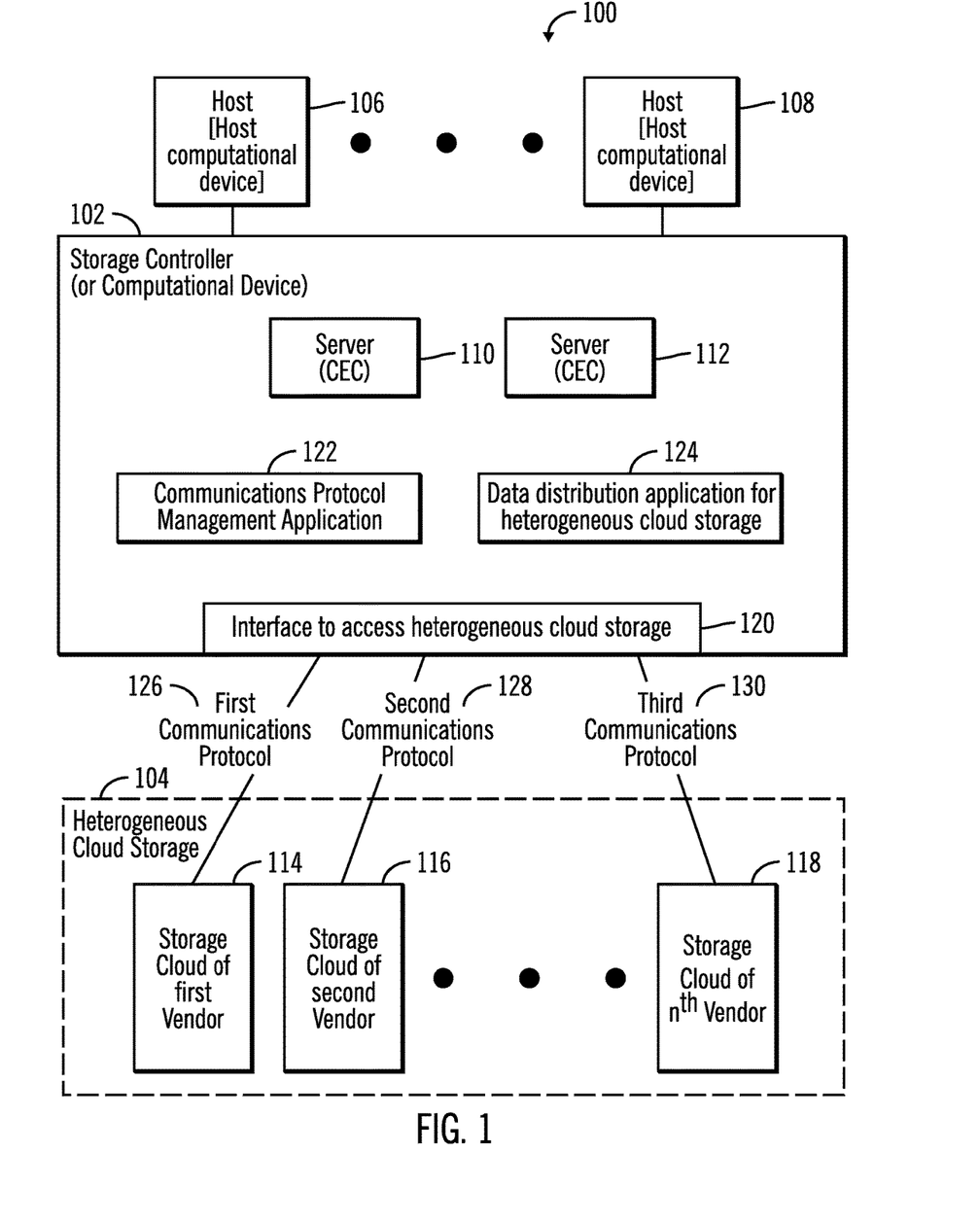
FIG. 1 illustrates a block diagram of a computing environment comprising a storage controller that is configured to communicate with a heterogeneous cloud storage via a plurality of protocols, in accordance with certain embodiments.

FIG. 1 illustrates a block diagram of a computing environment 100 comprising a storage controller 102 that is configured to communicate with a heterogeneous cloud storage 104 via a plurality of protocols, in accordance with certain embodiments. The storage controller 102 allows a plurality of host computational devices 106, 108 to perform input/output (I/O) operations with logical storage maintained by the storage controller 102. The physical storage corresponding to the logical storage is found in the heterogeneous cloud storage 104.

The storage controller 102 comprises a plurality of server computational devices 110, 112. The server computational devices 110, 112 may also be referred to as servers or central electronic complexes (CEC) or processor complexes. The storage controller 102 may comprise a set of hardware that includes central processing units (CPU), memory, channels, controllers, etc. The servers 110, 112 of the storage controller 102, the storage controller 102, and the hosts 106, 108 may comprise any suitable computational device including those presently known in the art, such as, a personal computer, a workstation, a server, a mainframe, a hand held computer, a palm top computer, a telephony device, a network appliance, a blade computer, a processing device, etc. The servers 110, 112, the storage controller 102, and the hosts 106, 108 may be elements in any suitable network, such as, a storage area network, a wide area network, the Internet, an intranet. In certain embodiments, the servers 110, 112 may function redundantly and one server may be able to take over the operations of the other server. In certain embodiments, the servers 110, 112 of the storage controller 102, the storage controller 102, the hosts 106, 108, and the heterogeneous cloud storage 104 may be elements in a cloud computing environment that comprises the computing environment 100.

The heterogeneous cloud storage 104 may be comprised of a plurality of storage clouds 114, 116, 118 where each of the plurality of storage clouds may be provided and maintained by a different entity. For example, a first vendor may provide the storage cloud 114, a second vendor may provide the storage cloud 116, and a third vendor may provide the storage cloud 118. The different storage clouds may be placed at different geographical locations separated by a considerable distance, such as at least 10 kilometers. The different storage clouds may be physically located in different states or countries, e.g., storage cloud 114 may be located in the United States, and storage cloud 116 may be located in Canada.

Each storage cloud 114, 116, 118 may be comprised of a plurality of storage devices, such as storage disks, tape drives, solid state storage, etc., that are maintained by a storage server that has an operating system. In certain embodiments, the storage cloud 114 maintained by the first vendor may have one operating system, whereas the storage cloud 116 maintained by the second vendor may have another operating system.

The storage controller 102 may have an interface 120 to access the heterogeneous cloud storage 104. A communications protocol management application 122 that executes in the storage controller 102 provides mechanisms for the storage controller 102 to communicate via different communications protocol to different storage clouds 114, 116, 118 of the heterogeneous cloud storage 104. For example, the communication protocol management application 122 may use first, second, and third communications protocols 126, 128, 130 to communicate with the storage clouds 114, 116, 118 respectively, where the first, second and third communications protocol 126, 128, 130 may be different from each other.

Additionally, a data distribution application 124 that distributes different parts of a dataset (or different datasets) in different storage clouds in the heterogeneous cloud storage 104 may execute in the storage controller 102. The communications protocol management application 122 and the data distribution application 124 may be implemented in software, firmware, or hardware, or any combination thereof, in accordance with certain embodiments.

Figure 2:
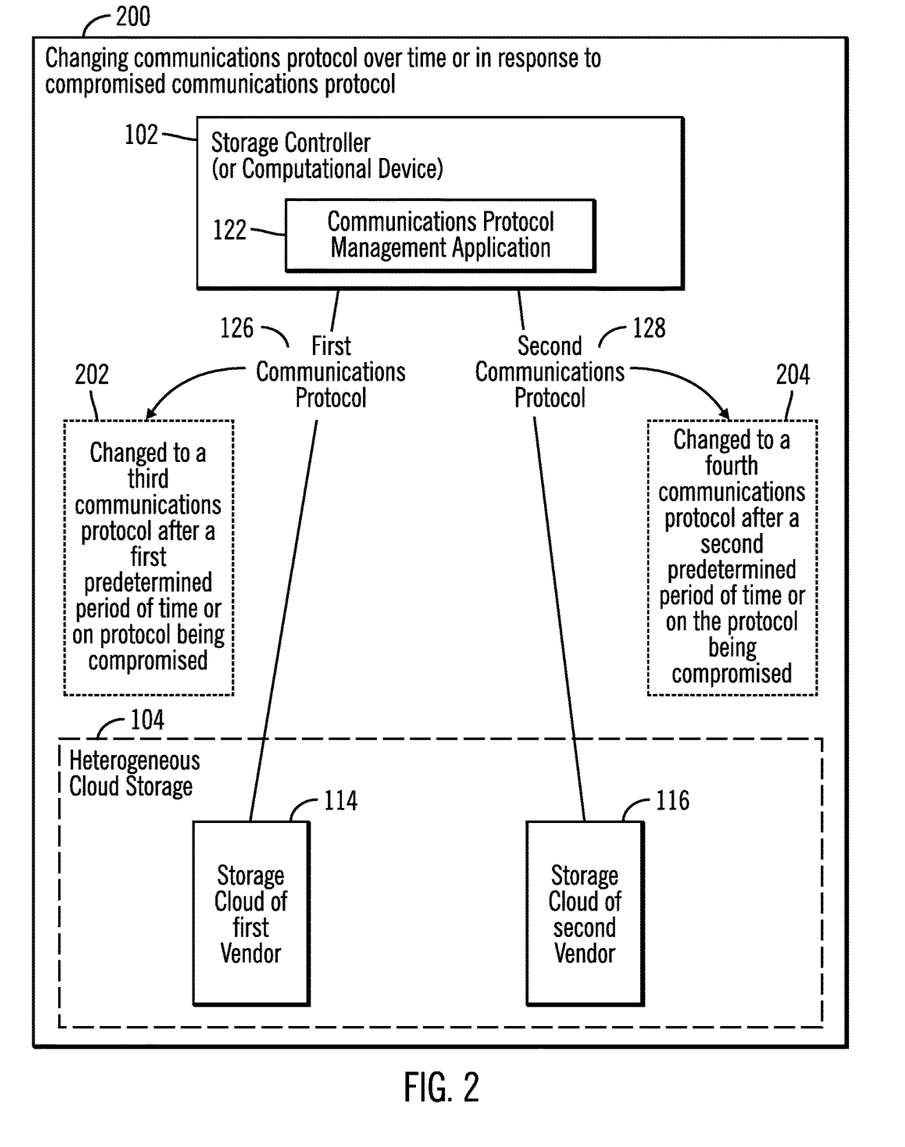
FIG. 2 illustrates a block diagram that shows different communications protocol to different storage clouds being changed over time, in accordance with certain embodiments.

FIG. 2 shows the storage controller 102 communicating with storage cloud 114 via the first communications protocol 126 to transfer data. The storage controller 102 also communicates with the storage cloud 116 via the second communications protocol 128 to transfer data.

In certain embodiments shown via reference numeral 202, the storage controller 102 changes the first communications protocol 126 to a different communications protocol after an elapse of a first predetermined amount of time, to transmit additional data from the storage controller 102 to the first cloud storage 114. The first communications protocol 126 may also be changed in response to a compromise of the first communications protocol 126.

In certain embodiments shown via reference numeral 204, the storage controller 102 changes the second communications protocol 128 to another communications protocol after an elapse of a second predetermined amount of time, to transmit further data to the second cloud storage. The second communications protocol 128 may also be changed in response to a compromise of the second communications protocol 128.

Therefore, FIG. 2 shows that communications protocols may be changed over time for communications to different storage clouds. In response to a compromise of a communications protocol, the communications protocol management application 122 may change the compromised communications protocol to another communications protocol that is not compromised.

Figure 3:
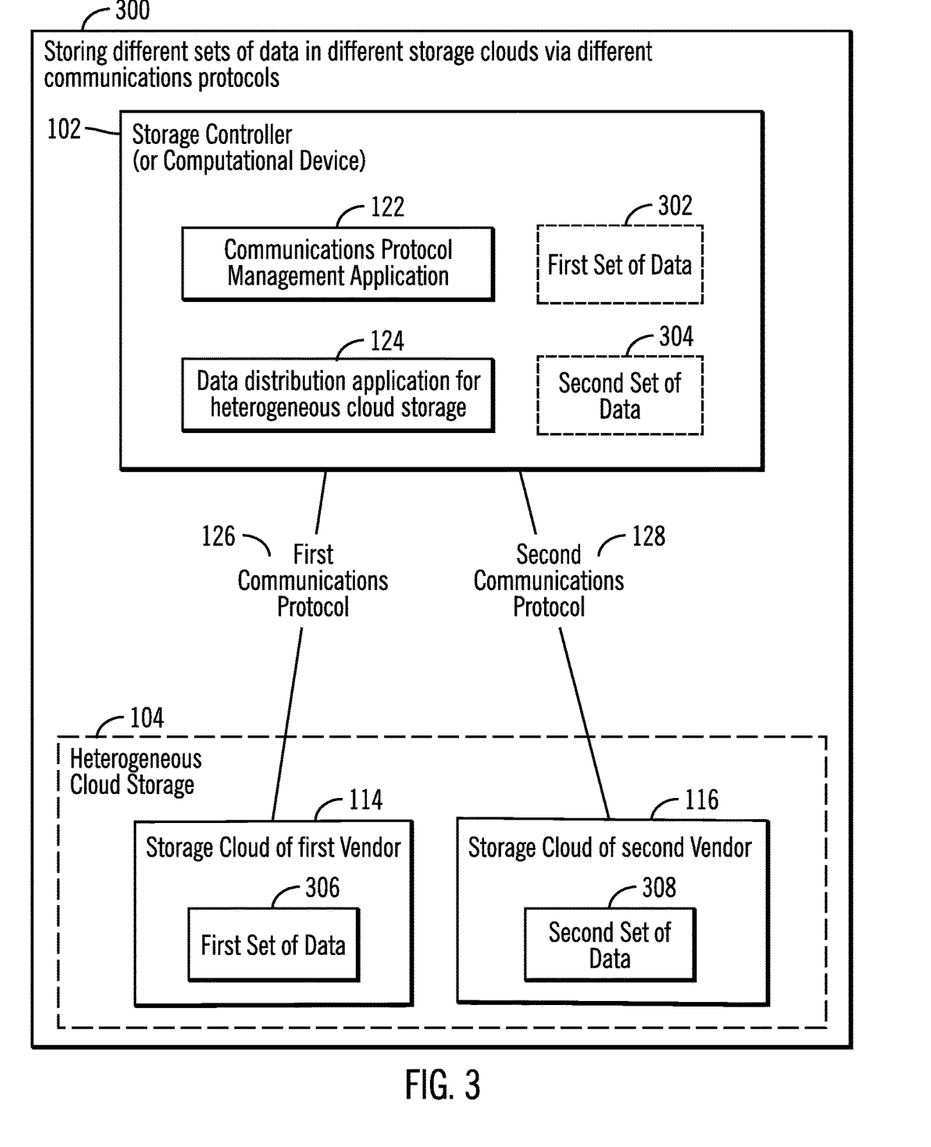
FIG. 3 illustrates a block diagram that shows different sets of data being stored in different storage clouds via different communications protocol, in accordance with certain embodiments.

FIG. 3 illustrates a block diagram 300 that shows different sets of data being stored in different storage clouds via different communications protocols in accordance with certain embodiments.

In FIG. 3, the storage controller 102 manages a first set of data 302 and a second set of data 304. The first set of data 302 and the second set of data 304 may be unrelated to each other or may be related to each other. The data distribution application 124 in association with the communications protocol management application 122 stores the first set of data 302 in the storage cloud 114 of the first vendor over the first communications protocol 126 (shown via reference numeral 306). The data distribution application 124 in association with the communications protocol management application 122 also stores the second set of data 304 in the storage cloud 116 of the second vendor over the second communications protocol 128 (shown via reference numeral 308).

Figure 4:
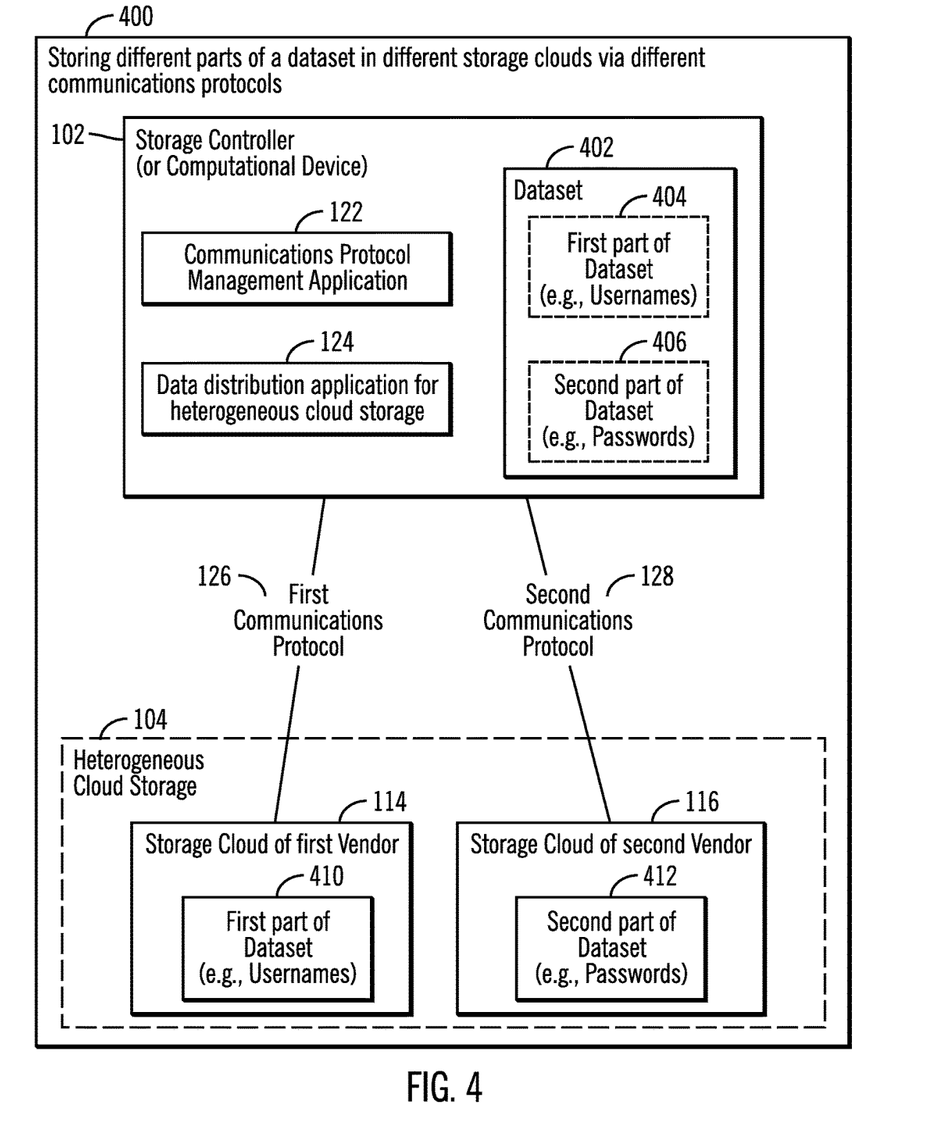
FIG. 4 illustrates a block diagram that shows different parts of a dataset being stored in different storage clouds via different communications protocol, in accordance with certain embodiments.

FIG. 4 illustrates a block diagram 400 that shows different parts of a dataset 402 being stored in different storage clouds via different communications protocols, in accordance with certain embodiments.

The dataset 402 may include a first part 404 and a second part 406. The data distribution application 124 in association with the communications protocol management application 122 stores the first part 404 of the dataset 402 in the storage cloud 114 of the first vendor over the first communications protocol 126 (shown via reference numeral 410). The data distribution application 124 in association with the communications protocol management application 122 also stores the second part 406 of the dataset 402 in the storage cloud 116 of the second vendor over the second communications protocol 128 (shown in reference numeral 412).

In FIG. 4, by distributing different parts of a dataset in different storage clouds greater security is achieved because compromise of one storage cloud does not lead to a theft of the entire dataset. For example, a dataset may have usernames in one part and passwords in another part. If passwords are separated from usernames and stored in different storage clouds, then theft of usernames caused by a compromised storage cloud that stores the usernames, may still protect the password which is stored in a storage cloud that is not compromised.

Figure 5:
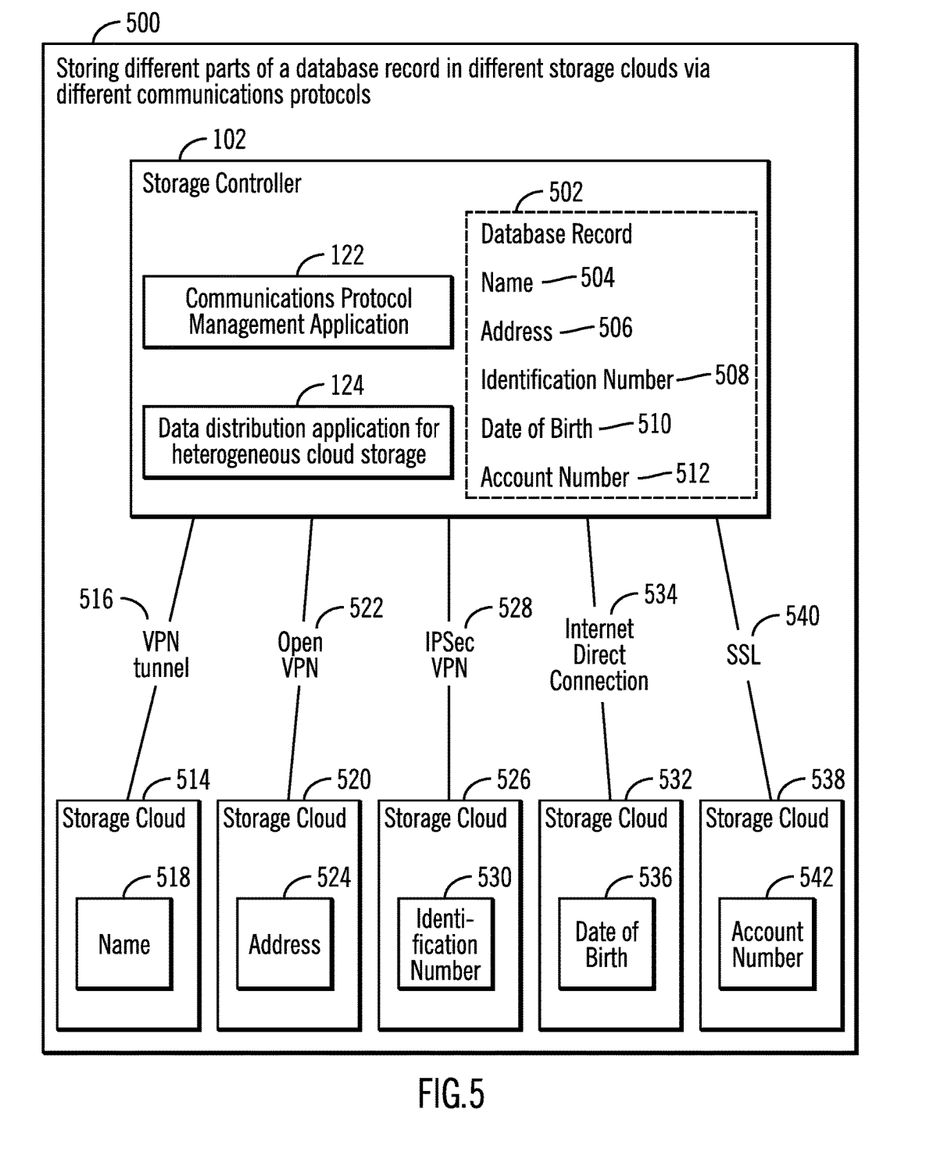
FIG. 5 illustrates a block diagram that shows different parts of a database record being stored in different storage clouds via different communications protocol, in accordance with certain embodiments.

FIG. 5 illustrates a block diagram 500 that shows different parts of a database record 502 being stored in different cloud storages via different communications protocol, in accordance with certain embodiments.

The database record 502 is comprised of five fields as follows:
(1) Name 504;
(2) Address 506;
(3) Identification Number 508;
(4) Date of Birth 510; and
(5) Account Number 512.

The data distribution application 124 in association with the communications protocol management application 122 stores the 'Name' 504 of the database record 502 in the storage cloud 514 over the VPN tunnel 516 (shown via reference numeral 518). The data distribution application 124 in association with the communications protocol management application 122 stores the 'Address' 506 of the database record 502 in the storage cloud 520 over the Open VPN based communications protocol 522 (shown via reference numeral 524).

The data distribution application 124 in association with the communications protocol management application 122 stores the 'Identification Number' 508 of the database record 502 in the storage cloud 526 over the IPSec VPN 528 (shown via reference numeral 530). The data distribution application 124 in association with the communications protocol management application 122 stores the 'Date of Birth' 510 of the database record 502 in the storage cloud 532 over the Internet Direct Connection 534 (shown via reference numeral 536). The data distribution application 124 in association with the communications protocol management application 122 stores the 'Account Number' 512 of the database record 502 in the storage cloud 538 over the SSL protocol 540 (shown via reference numeral 542).

Therefore, FIG. 5 shows that different parts of a database record may be stored in different cloud storages via different communications protocols.

Figure 6:
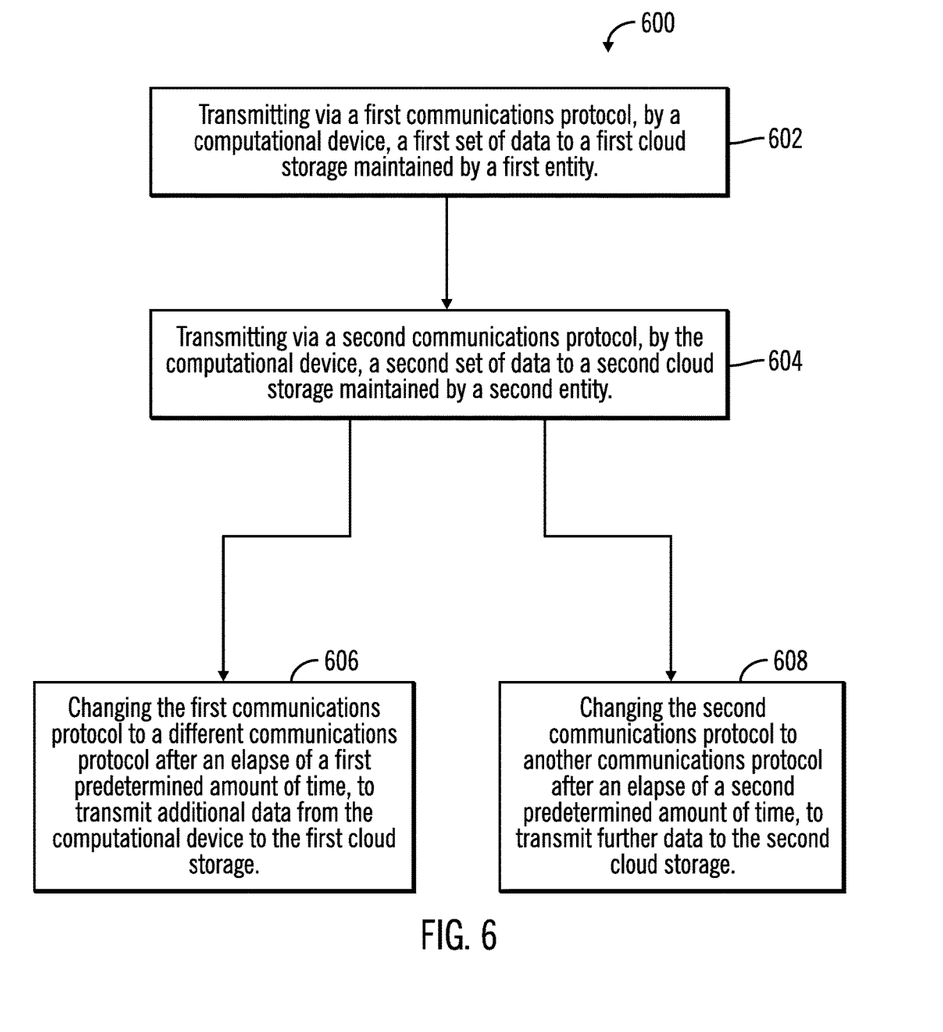
FIG. 6 illustrates a flowchart that shows operations performed by the storage controller, in accordance with certain embodiments.

FIG. 6 illustrates a flowchart 600 that shows operations performed by the storage controller 102, in accordance with certain embodiments.

Control starts at block 602 in which a computational device 102 (e.g., the storage controller 102) transmits, via a first communications protocol 126, a first set of data to a first cloud storage 114 maintained by a first entity. The computational device 102 transmits (at block 604), via a second communications protocol 128, a second set of data to a second cloud storage 116 maintained by a second entity.

From block 604, control may proceed in parallel to blocks 606 and 608. In block 606, the computational device 102 changes the first communications protocol 126 to a different communications protocol after an elapse of a first predetermined amount of time, to transmit additional data from the computational device 102 to the first cloud storage 114.

In block 608, the computational device 102 changes the second communications protocol 128 to another communications protocol after an elapse of a second predetermined amount of time, to transmit further data to the second cloud storage 116.

In additional embodiments, in response to a compromise of the first or the second communications protocol, the computational device 102 changes the compromised communications protocol to another communications protocol that is not compromised.

In certain embodiments, the computational device 102 is a storage controller coupled to a plurality of hosts 106, 108, where the first cloud storage 114 is separated at least by 10 kilometers from the second cloud storage 116, and where the first entity and the second entity are different vendors that provide cloud computing services to the storage controller 102 for the plurality of hosts 106, 108.

In additional embodiments, the first communications protocol 126 comprises a Virtual Private Network (VPN) tunnel, and the second communications protocol 128 comprises an Internet direct connect. The first communications protocol is changed from the VPN tunnel to a Secure Sockets Layer (SSL) protocol, subsequent to an expiry of a period of time.

Therefore, FIGS. 1-8 illustrate certain embodiments to distribute different parts of data to cloud storages provided by different vendors via different communications protocols that may be changed in response to a compromised protocol or may be changed periodically. As a result, security and redundancy may be provided for data and certain communications protocol breaches may be tolerated.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
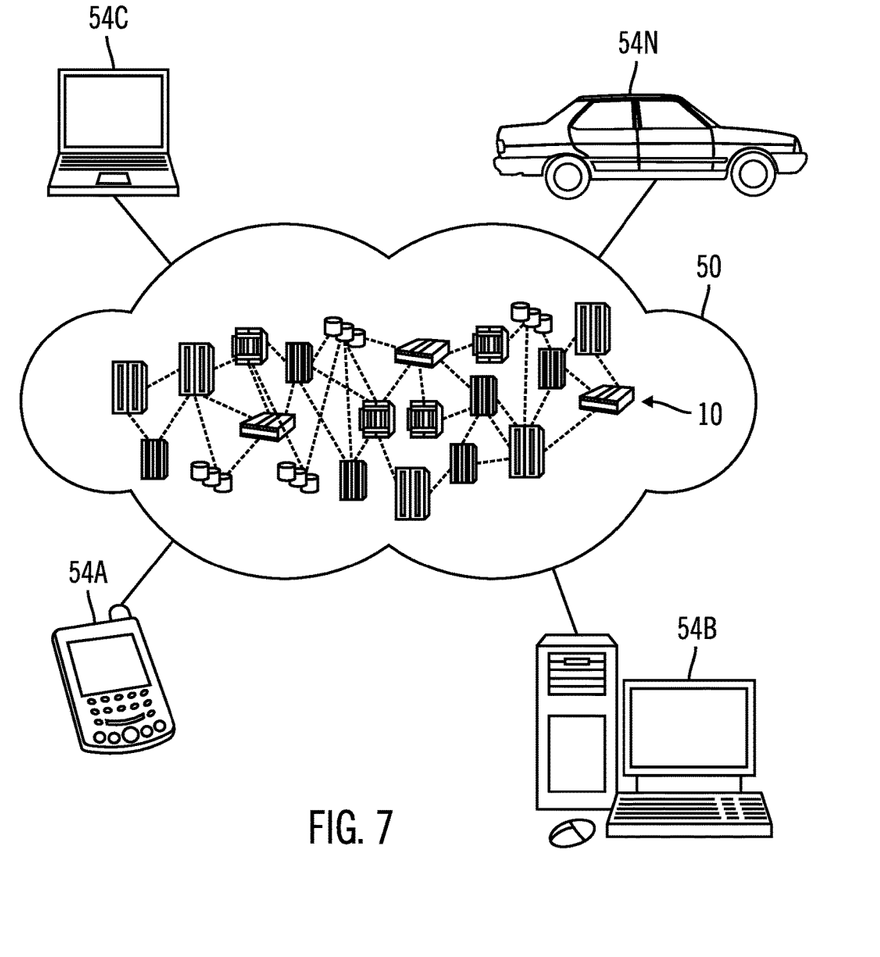
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
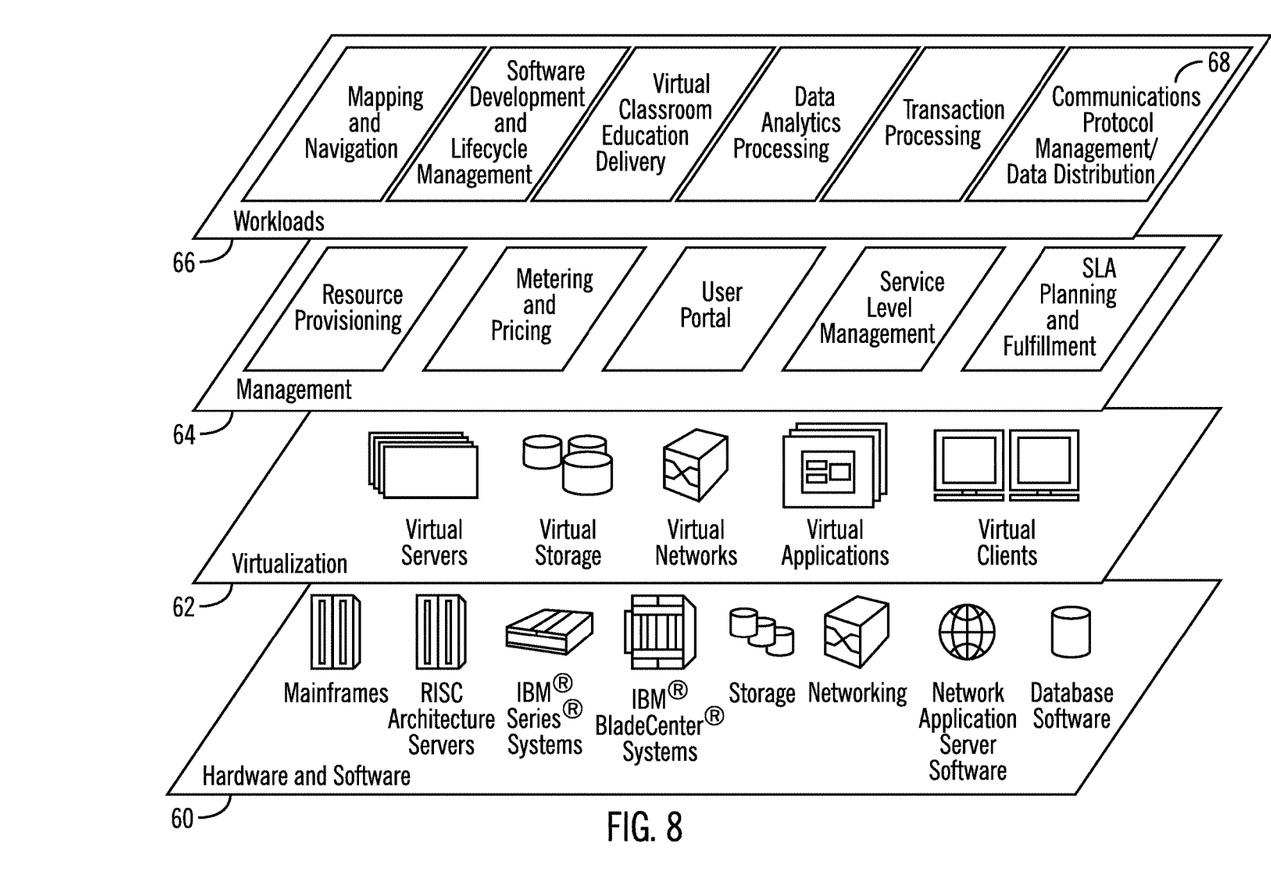
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the workload and functions provided by the communications protocol management application 122 and the data distribution application 124 (shown via reference numeral 68 in FIG. 8) as shown in FIGS. 1-7. The cloud computing environment shown in FIGS. 7-8 may include the computing environment 100 shown in at least FIG. 1.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
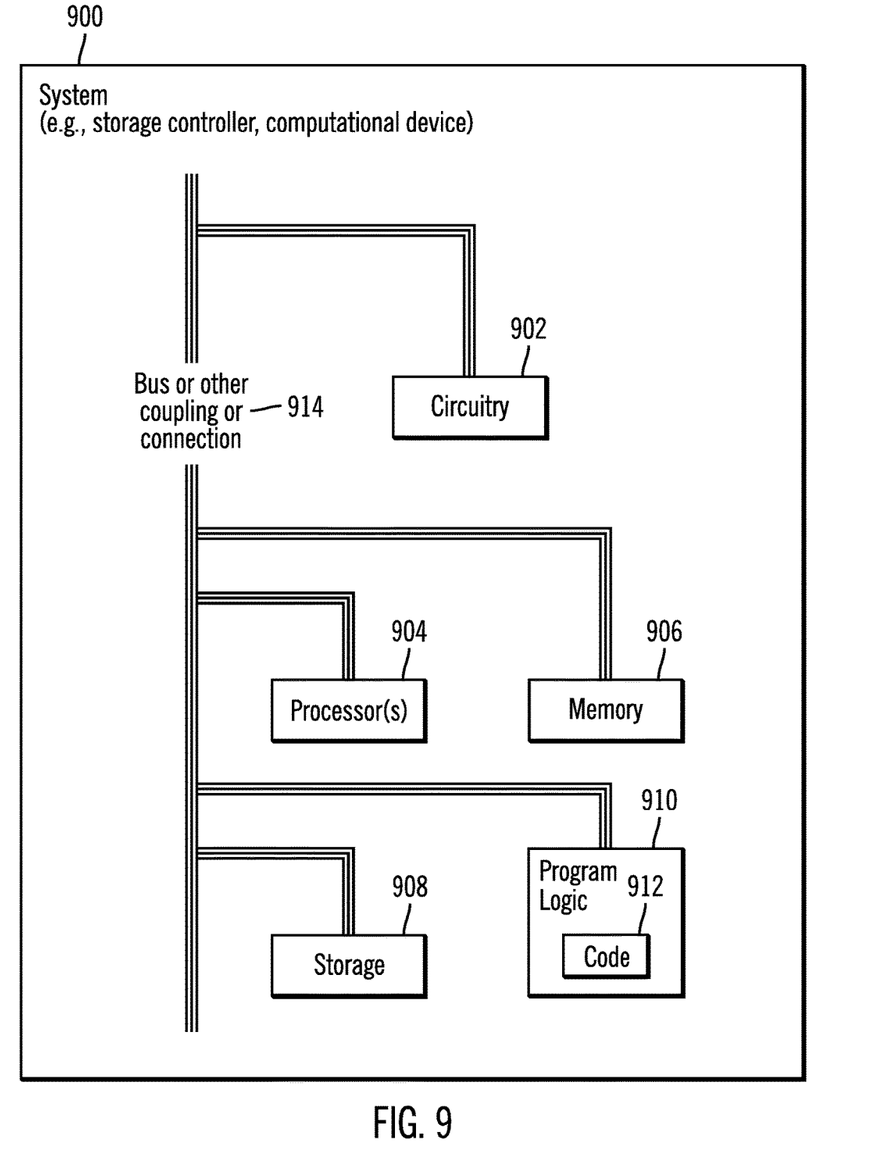
FIG. 9 illustrates a block diagram of a computational system that shows certain elements that may be included in the storage controller including servers shown in FIG. 1, in accordance with certain embodiments.

FIG. 9 illustrates a block diagram that shows certain elements that may be included in the storage controller 102, the servers 110, 112, the hosts 106, 108 or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining a computational device having an interface to access a heterogeneous cloud storage comprised of a first cloud storage maintained by a first entity and a second cloud storage maintained by a second entity;
transmitting, via a first communications protocol over the interface, by a communication protocol management application of the computational device, a first set of data comprising usernames, to the first cloud storage maintained by the first entity;
transmitting via a second communications protocol over the interface, by the communication protocol management application of the computational device, a second set of data comprising passwords corresponding to the usernames, to the second cloud storage maintained by the second entity;
in response to an elapse of a first predetermined amount of time, changing, by the computational device, the first communications protocol to a third communications protocol, wherein the first communications protocol is also changed to the third communications protocol in response to the first communications protocol being compromised; and
in response to an elapse of a second predetermined amount of time, changing, by the computational device, the second communications protocol to a fourth communications protocol, wherein the second communications protocol is also changed to the fourth communications protocol in response to the second communications protocol being compromised.

2. The method of claim 1, wherein the first set of data and the second set of data are both parts of an entire dataset, wherein the entire dataset is stored in the first cloud storage and the second cloud storage by storing the first set of data in the first cloud storage and the second set of data in the second cloud storage.

3. The method of claim 1, wherein the computational device is a storage controller coupled to a plurality of hosts, and wherein the first entity and the second entity are different vendors that provide cloud computing services to the storage controller for the plurality of hosts.

4. The method of claim 1, wherein the first communications protocol comprises a Virtual Private Network (VPN) tunnel, wherein the second communications protocol comprises an Internet direct connect, and wherein the first communications protocol is changed from the VPN tunnel to a Secure Sockets Layer (SSL) protocol, subsequent to an expiry of a period of time.

5. A system, comprising:
a memory; and
a processor coupled to the memory, wherein the processor performs operations, the operations comprising:
maintaining an interface to access a heterogeneous cloud storage comprised of a first cloud storage maintained by a first entity and a second cloud storage maintained by a second entity;

transmitting, via a first communications protocol over the interface, by a communication protocol management application, a first set of data comprising usernames, to the first cloud storage maintained by the first entity;

transmitting via a second communications protocol over the interface, by the communication protocol management application, a second set of data comprising passwords corresponding to the usernames, to the second cloud storage maintained by the second entity;

in response to an elapse of a first predetermined amount of time, changing the first communications protocol to a third communications protocol, wherein the first communications protocol is also changed to the third communications protocol in response to the first communications protocol being compromised; and in response to an elapse of a second predetermined amount of time, changing the second communications protocol to a fourth communications protocol, wherein the second communications protocol is also changed to the fourth communications protocol in response to the second communications protocol being compromised.

6. The system of claim 5, wherein the first set of data and the second set of data are both parts of an entire dataset, wherein the entire dataset is stored in the first cloud storage and the second cloud storage by storing the first set of data in the first cloud storage and the second set of data in the second cloud storage.

7. The system of claim 5, wherein the system is a storage controller coupled to a plurality of hosts, and wherein the first entity and the second entity are different vendors that provide cloud computing services to the storage controller for the plurality of hosts.

8. The system of claim 5, wherein the first communications protocol comprises a Virtual Private Network (VPN) tunnel, wherein the second communications protocol comprises an Internet direct connect, and wherein the first communications protocol is changed from the VPN tunnel to a Secure Sockets Layer (SSL) protocol, subsequent to an expiry of a period of time.

9. A computer program product, the computer program product comprising a computer readable storage medium having computer readable program code embodied therewith, the computer readable program code configured to perform operations in a computational device, the operations comprising:

maintaining an interface to access a heterogeneous cloud storage comprised of a first cloud storage maintained by a first entity and a second cloud storage maintained by a second entity;

transmitting, via a first communications protocol over the interface, by a communication protocol management application of the computational device, a first set of data comprising usernames, to the first cloud storage maintained by the first entity;

transmitting via a second communications protocol over the interface, by the communication protocol management application of the computational device, a second set of data comprising passwords corresponding to the usernames, to the second cloud storage maintained by the second entity;

in response to an elapse of a first predetermined amount of time, changing, by the computational device, the first communications protocol to a third communications protocol, wherein the first communications protocol is also changed to the third communications protocol in response to the first communications protocol being compromised; and in response to an elapse of a second predetermined amount of time, changing, by the computational device, the second communications protocol to a fourth communications protocol, wherein the second communications protocol is also changed to the fourth communications protocol in response to the second communications protocol being compromised.

10. The computer program product of claim 9, wherein the first set of data and the second set of data are both parts of an entire dataset, wherein the entire dataset is stored in the first cloud storage and the second cloud storage by storing the first set of data in the first cloud storage and the second set of data in the second cloud storage.

11. The computer program product of claim 9, wherein the computational device is a storage controller coupled to a plurality of hosts, wherein the first entity and the second entity are different vendors that provide cloud computing services to the storage controller for the plurality of hosts, wherein the first communications protocol comprises a Virtual Private Network (VPN) tunnel, wherein the second communications protocol comprises an Internet direct connect, and wherein the first communications protocol is changed from the VPN tunnel to a Secure Sockets Layer (SSL) protocol, subsequent to an expiry of a period of time.

* * * * *